(12) United States Patent
Kabalnov et al.

(10) Patent No.: US 6,991,676 B2
(45) Date of Patent: Jan. 31, 2006

(54) DYE SETS AND INK SETS FOR INK-JET INK IMAGING

(75) Inventors: Alexey S Kabalnov, Corvallis, OR (US); Charles G. Dupuy, Corvallis, OR (US); Luanne J. Rolly, Corvallis, OR (US); Naomi Oak, Corvallis, OR (US); Patricia A Wang, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 10/623,001

(22) Filed: Jul. 18, 2003

(65) Prior Publication Data

US 2005/0011406 A1    Jan. 20, 2005

(51) Int. Cl.
    *C09D 11/02* (2006.01)

(52) U.S. Cl. ............... 106/31.48; 106/31.49; 106/31.5; 106/31.51; 106/31.52; 8/639; 8/641; 8/658; 8/661; 8/673; 8/682; 8/684; 8/685; 8/686; 8/687; 8/681

(58) Field of Classification Search ........... 106/31.48, 106/31.49, 31.5, 31.51, 31.52; 8/639, 641, 8/658, 661, 673, 684, 682, 685, 686, 687, 8/681
See application file for complete search history.

(56) References Cited

U.S. PATENT DOCUMENTS

| | | | |
|---|---|---|---|
| 5,534,051 A | | 7/1996 | Lauw |
| 5,772,742 A | | 6/1998 | Wang |
| 5,844,100 A | | 12/1998 | Baettig |
| 5,851,273 A | | 12/1998 | Morris et al. |
| 5,858,075 A | | 1/1999 | Deardurff et al. |
| 6,001,161 A | | 12/1999 | Evans et al. |
| 6,053,969 A | | 4/2000 | Lauw et al. |
| 6,379,442 B1 * | 4/2002 | Lavery et al. ........... 106/31.51 |
| 6,521,030 B1 * | 2/2003 | Stoffel ................. 106/31.27 |
| 6,521,032 B1 * | 2/2003 | Lehmann et al. ........ 106/31.51 |
| 6,596,067 B2 * | 7/2003 | Menzel et al. ........... 106/31.51 |
| 6,673,140 B2 * | 1/2004 | Tyrell et al. ............ 106/31.5 |
| 6,808,555 B2 * | 10/2004 | Wang et al. ............ 106/31.43 |
| 6,824,598 B2 * | 11/2004 | Thornberry et al. ...... 106/31.27 |
| 6,843,838 B2 * | 1/2005 | Zimmer et al. .......... 106/31.27 |
| 2003/0110980 A1 | | 6/2003 | Thornberry et al. |
| 2004/0074018 A1 * | 4/2004 | Wuzik et al. ................ 8/543 |
| 2004/0123772 A1 | | 7/2004 | Zimmer et al. |
| 2005/0011402 A1 * | 1/2005 | Kabalnov et al. ........ 106/31.5 |

* cited by examiner

*Primary Examiner*—Helene Klemanski

(57) ABSTRACT

The present invention is drawn to dye sets for formulating ink-jet ink sets, and to specific ink sets. The dye set can comprise cyan colorant including a phthalocyanine dye; magenta colorant including a copper- or nickel-containing azo dye; and yellow colorant including at least one of Yellow 1189 dye and Yellow 104 dye yellow colorant having the structure Formula 1:

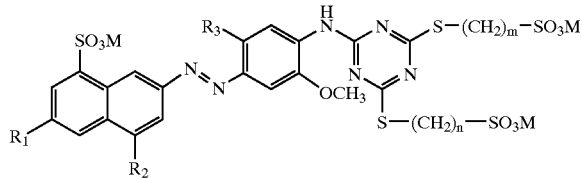

wherein $R_1$ is H, $SO_3M$, COOM, or $SO_2NH_2$; and wherein $R_2$ is H, $SO_3M$, COOM, or $SO_2NH_2$; and wherein $R_3$ is H or $CH_3$; and wherein n and m are 2, 3, 4, 5 or 6; and wherein M is H, Na, Li, K, ammonium, ammonium substituted with alkyl or combinations thereof. Optionally, a cyan triarylmethine dye such as Acid Blue 9, or another similar cyan dye, can be blended with the phthalocyanine dye; a rhodamine dye can be blended with the copper- or nickel-containing azo dye; and/or Acid Yellow 17 or Acid Yellow 23 can be blended with Formula 1.

36 Claims, No Drawings

DYE SETS AND INK SETS FOR INK-JET INK IMAGING

FIELD OF THE INVENTION

The present invention is drawn to the area of ink-jet imaging. More specifically, the present invention is drawn to cyan, magenta, and yellow dye sets.

BACKGROUND OF THE INVENTION

Color characteristics of dye-containing inks play an important role in the quality of the printed ink-jet image. Perceived color quality can be characterized using any one of several color space systems, such as CIELAB or Munsell, as is well known in the art. With respect to Munsell color space, a given color is defined using three terms, namely Hue, Value, and Chroma. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). Additional terms such as h° (hue angle) and C* (chroma) are used to further describe a given color, as is known to those skilled in the art. A single ink-jet ink of a first color that has good chroma, gamut, hue angle, and lightfastness is not always optimal for use with other colors. In other words, not only does an individual color, i.e., cyan, magenta, or yellow, have to have acceptable color qualities, but the ink-set in which it is used also plays a role in whether the ink-jet ink performs in an acceptable manner. Thus, the appropriate combining of certain inks together in an ink-set can improve image quality.

Accordingly, investigations continue into developing ink formulations that have improved properties and that do not improve one property at the significant expense of the others. Additionally, dye and ink combinations to form optimized dye sets and ink sets, respectively, is also a focus of investigation. Many challenges still remain to further improve the image quality, airfastness, chroma, and lightfastness of ink-jet prints without sacrificing pen performance and reliability.

SUMMARY OF THE INVENTION

It has been recognized that it would be advantageous to develop dye sets and ink-jet ink sets that exhibit good gamut, lightfastness, and chroma. As such, a dye set for formulating ink-jet inks is provided comprising cyan colorant including a phthalocyanine dye; magenta colorant including a copper- or nickel-containing azo dye; and yellow colorant including a yellow colorant having the structure Formula 1:

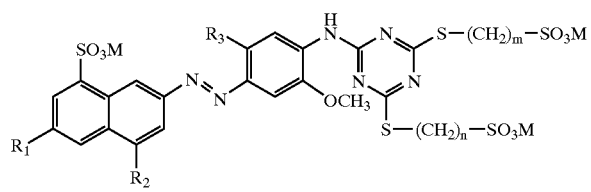

wherein $R_1$ is H, $SO_3M$, COOM, or $SO_2NH_2$;
and wherein $R_2$ is H, $SO_3M$, COOM, or $SO_2NH_2$;
and wherein $R_3$ is H or $CH_3$; and wherein n and m are 2, 3, 4, 5 or 6;
and wherein M is H, Na, Li, K, ammonium, ammonium substituted with alkyl or combinations thereof.

Alternatively, an ink set for ink-jet printing can comprise a cyan ink-jet ink including a first ink vehicle admixed with from 2 wt % to 10 wt % of a phthalocyanine dye; a magenta ink-jet ink including a second ink vehicle admixed with from 0.8 wt % to 8 wt % of a copper- or nickel-containing azo dye; and a yellow ink-jet ink including a third ink vehicle admixed with from 1.5 wt % to 9 wt % of a yellow colorant having the structure Formula 1:

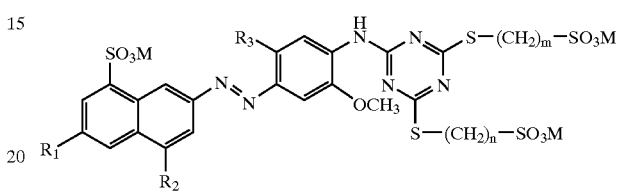

wherein $R_1$ is H, $SO_3M$, COOM, or $SO_2NH_2$;
and wherein $R_2$ is H, $SO_3M$, COOM, or $SO_2NH_2$;
and wherein $R_3$ is H or $CH_3$; and wherein n and m are 2, 3, 4, 5 or 6;
and wherein M is H, Na, Li, K, ammonium, ammonium substituted with alkyl or combinations thereof.

Additional features and advantages of the invention will be apparent from the detailed description which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

As used herein, "effective amount" refers to at least the minimal amount of a substance or agent, which is sufficient to achieve a desired effect. For example, an effective amount of an "ink vehicle" is at least the minimum amount required in order to create an ink composition, while maintaining properties necessary for effective ink-jetting.

As used herein, "liquid vehicle" or "ink vehicle" refers to the liquid fluid in which colorant is placed to form an ink. Ink vehicles are well known in the art, and a wide variety of ink vehicles may be used with the systems and methods of the present invention. Such ink vehicles may include a mixture of a variety of different agents, including, surfactants, solvents, co-solvents, buffers, biocides, sequestering agents, viscosity modifiers, surface-active agents, water, etc.

The term "substantially" when used with another term shall include from mostly to completely.

With this in mind, the present invention is drawn to the area of ink-jet imaging. More specifically, the present invention is drawn to dye sets for use with ink-jet ink vehicles, as well as to ink sets for ink-jet imaging.

In one embodiment, a dye set for formulating ink-jet inks can comprise cyan colorant including a phthalocyanine dye; magenta colorant including a copper- or nickel-containing azo dye; and yellow colorant including a dye having the structure of Formula 1.

In another embodiment, an ink set for ink-jet printing can comprise the dye set described above, wherein each color of the dye set is included in an ink vehicle. For example, a cyan ink-jet ink can be included that comprises a first ink vehicle admixed with from 2 wt % to 10 wt % of a phthalocyanine dye. A magenta ink-jet ink can be included that comprises a second ink vehicle admixed with from 0.8 wt % to 8 wt % of a copper- or nickel-containing azo dye. Further, a yellow ink-jet ink can be included that comprises a third ink vehicle admixed with from 1.5 wt % to 9 wt % of Formula 1. Other dyes or pigments can also be included in the individual inks. Additionally, other inks can be added to this ink set in separate pens, including black, or additional magenta, cyan, or yellow inks. For example, four, five, or six pen ink sets are common in the industry, and the cyan-magenta-yellow ink set described herein could be incorporated into such a system as is known in the art.

When referring to an ink or an ink set, dyes are understood to be admixed within an ink vehicle. Dye sets are combinations of dyes that are configured for inclusion in ink vehicles. Thus, when discussing various specific embodiments of the present invention, such embodiments can apply to both the dye set and ink set, unless indicated otherwise.

Various additional dyes can optionally be present in the dye set or the ink set described above. For example, the cyan colorant of the dye set or the ink set can further comprise CI Acid Blue 9 dye (abbreviated as AB9) blended with the phthalocyanine dye at a 1:2 to 1:100 weight ratio. Alternatively, or in addition to this, the magenta colorant of the dye set or the ink set can further comprise a rhodamine dye blended with the copper- or nickel-containing azo dye at a 1:80 to 125:4 weight ratio. Further, the yellow colorant of the dye set or ink set can further comprise CI Acid Yellow 17 (abbreviated as AY17) and/or CI Acid Yellow 23 (abbreviated as AY23) blended with a yellow dye having the structure of Formula 1 shown below:

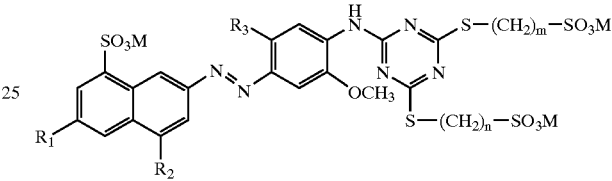

In the above Formula 1, $R_1$, is H, $SO_3M$, COOM, or $SO_2NH_2$; $R_2$ is H, $SO_3M$, COOM, or $SO_2NH_2$; $R_3$ is H or $CH_3$; n and m are 2, 3, 4, 5 or 6; and M is H, Na, Li, K, ammonium, ammonium substituted with alkyl or combinations thereof.

A preferred embodiment of the Formula 1 yellow dye is the dye having the structure of Formula 2 shown below:

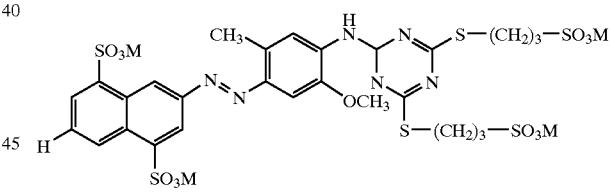

In Formula 2, M is H, Na or Li.

Another preferred embodiment of the Formula 1 yellow dye is the dye having the structure of Formula 3 shown below:

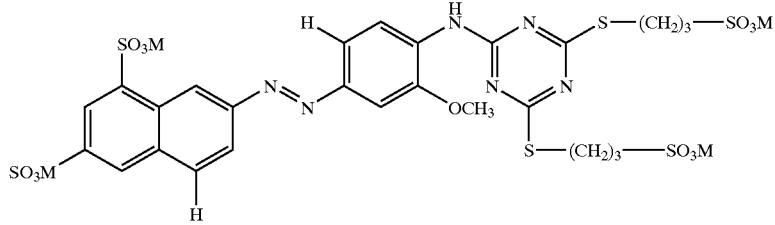

In Formula 3, M is H, Na or Li.

With respect to the phthalocyanine dye or dyes, any functional phthalocyanine dye or dyes can be used in accordance with embodiments of the present invention, and a few are provided herein by way of example. Desired phthalocyanine dyes that can be used alone or in combination include CI Direct Blue199 (abbreviated as DB199) and/or other dyes according to the following Formula:

Formula 4

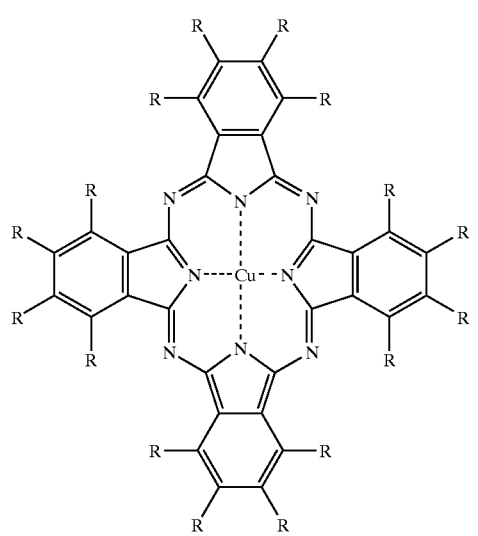

wherein each R group can independently be H or a functional group (such as a water solubilizing group) including $SO_3H$, $SO_2NH_2$, or $SO_2NH$-alkyl-OH. By "alkyl" what is meant is lower alkyl having from 1 to 3 carbon atoms. In one embodiment, there can be an average of from 1 to 4 $SO_3H$ groups functionalized on the dye, from 0.25 to 2 $SO_2NH_2$ groups functionalized on the dye, and from 0.25 to 2 $SO_2NH$-alkyl-OH groups functionalized on the dye. In a more detailed embodiment, there can be an average of from 2 to 3 $SO_3H$ groups functionalized on the dye, from 0.5 to 1 $SO_2NH_2$ groups functionalized on the dye, and from 0.5 to 1 $SO_2NH$-alkyl-OH groups functionalized on the dye. In further detail, an average of about two to six total R groups other than H can be present. In one embodiment, an average of about four total R groups other than H can be present. By "average," what is meant is that the totality of any given functional group in a dye lot or batch will yield a value within the stated average numerical range. For example, a functional group range of 0.5 to 1 means that some molecules of a dye batch can be void of that functional group, and others can contain 1 or more of that functional group. Thus, one dye batch can have a 0.5 average value, and another dye batch can have a 1 average value, and both batches would be within the recited range.

As mentioned, the phthalocyanine dye of the dye set or ink set can be a single phthalocyanine dye, or a combination of at least two phthalocyanine dyes blended together. Additionally, any salt form of this dye that is functional is included under Formula 4.

With respect to the copper- or nickel-containing azo dye, any functional dye that meets these criteria can be used.

Examples include CI Reactive Red 23, and CI Reactive Red 23 in the pacified form. An example of such a Reactive Red 23 in the pacified form includes Formula 5 below:

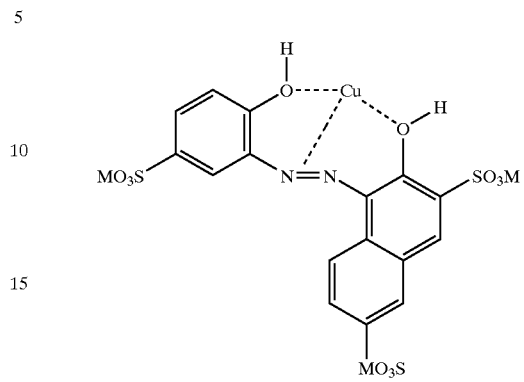

wherein each M can be H or a monovalent ion such as $Na^+$, $Li^+$, $K^+$, $NH_4^+$, and combinations thereof. Alternative examples include nickel metallized naphthol azo triazole dyes, and dyes having a structure according to Formula 6 below:

Formula 6

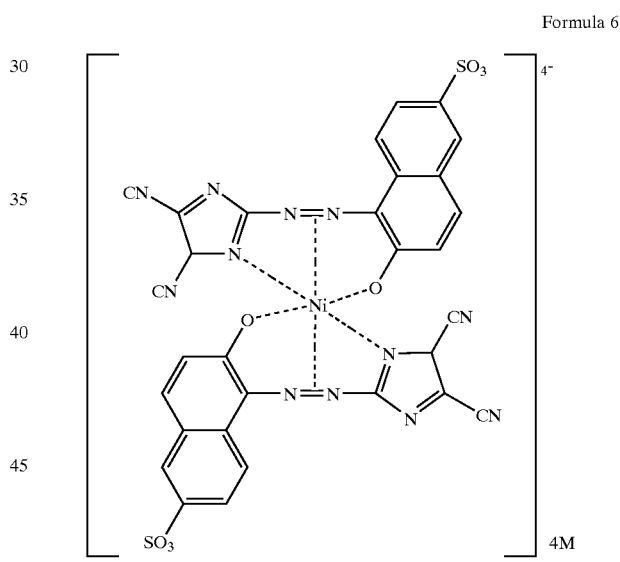

wherein M can be H or a monovalent ion such as $Na^+$, $Li^+$, $K^+$, $NH_4^+$, and combinations thereof. Though the dye(s) shown in the above Formulas are functionalized with $SO_3$ (or $SO_3M$) groups at specific locations, this is provided by example only. One skilled in the art would recognize that other solubilizing groups or other locations can be functionalized with similar success. Such modifications are included herein. As mentioned, the copper- or nickel-containing azo dye can be a single copper- or nickel-containing azo dye, or can be at least two copper- or nickel-containing azo dyes blended together.

With respect to the rhodamine dye that can optionally be used for the magenta dye or ink, any functional rhodamine dye can be used. Examples include CI Acid Red 52, Acid Red 289, Acid Red 388, and mixtures thereof.

With respect to yellow of the dye set and/or ink set, the yellow dye for use can be one of several combinations, including Formula 2 and Acid Yellow 17 at a 3:10 to 90:1 weight ratio; Formula 2 and Acid Yellow 23 at a 3:10 to 90:1 weight ratio; Formula 3 and Acid Yellow 17 at a 3:10 to 90:1 weight ratio; or Formula 3 and Acid Yellow 23 at a 3:10 to 90:1 weight ratio. Alternatively, three of the four yellow dyes or all four yellow dyes can be used as a single dye batch colorant, or within a single inkjet ink.

With respect to the ink sets that can be formulated using the dyes described herein, the cyan ink-jet ink can further comprise from 0.1 wt % to 1 wt % of Acid Blue 9 admixed in the first ink vehicle. Alternatively or additionally, the magenta ink-jet ink can further comprise from 0.1 wt % to 2.5 wt % of a rhodamine dye admixed in the second ink vehicle. Further, the yellow ink-jet ink can further comprise from 0.1 wt % to 5 wt % of Acid Yellow 17 and/or Acid Yellow 23 admixed in the third ink vehicle.

The ink sets for printing ink-jet images disclosed can be used with commercially available ink-jet printers, such as DESKJET™ and other similar printers manufactured by Hewlett-Packard Company. These ink sets can produce true colors on a variety of media, including uncoated media, clay coated media, inorganic porous media, and gelatin-coated media, each with improved lightfastness and gamut.

In an alternative embodiment of the present invention, each color of the ink set, namely cyan, yellow, and magenta, can be present in more than one ink, each having more than one dye load. That is, there can be one or more ink-jet pen filled for each ink color, each pen having a different dye load, a different dye, different vehicle components, different amounts of vehicle components, etc. For example, there can be two magenta pens, each one containing a different dye load and/or a different magenta dye.

The ink-jet inks set forth herein can be used as part of ink sets that provide images having excellent gamut, image quality, lightfastness, and permanence. In one embodiment, an ink set for ink-jet printing can comprise a three-ink ink set of cyan ink, magenta ink, and yellow ink. Pigment- or dye-based black inks can optionally be present as well. Still further, in an alternative embodiment, a second magenta ink can be present, as well as a second cyan ink, each having small dye loads in functional amounts, e.g., dye load from 0.1 wt % to 2.0 wt %.

The above embodiments are merely provided to set forth some examples. Those skilled in the art will appreciate modifications that are also within the scope of the present invention.

A typical ink vehicle formulation that can be used with a dye set of the present invention can include one or more solvent or co-solvents, present in total at from 5.0% to 50.0% by weight, and one or more non-ionic, cationic, and/or anionic surfactant, present from 0.01% to 10.0% by weight. The balance of the formulation can be purified water, or other vehicle components known in the art such as biocides, viscosity modifiers, materials for pH adjustment, sequestering agents, preservatives, and the like.

Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0.01% to 10.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, can be used. Viscosity modifiers and buffers may also be present, as well as other additives known to those skilled in the art to modify properties of the ink as desired. Such additives can be present at from 0.01% to 20% by weight.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Ink-jet Ink Vehicle

Two ink-jet ink vehicles were formulated that work well with the dye sets of the present invention. These ink vehicles can be used to form ink-jet inks in accordance with embodiments of the present invention. However, these ink vehicles are not the only ink vehicles that can be used. Tables 1a and 1b below provide two acceptable examples of ink vehicles:

TABLE 1a

Ink Vehicle 1

| Component | Amount |
|---|---|
| Trimethylolpropane | 7.5 wt % |
| 2-pyrrolidinone | 6.5 wt % |
| 1,5-pentanediol | 8 wt % |
| EDTA disodium salt | 75 ppm |
| Trizma base | 0.2 wt % |
| Magnesium nitrate hexahydrate | 3 wt % |
| Tergitol 15S7 | 1 wt % |
| Tergitol 15S5 | 1 wt % |
| Dowfax 8390 | 0.4 wt % |
| Water | Balance |

TABLE 1b

Ink Vehicle 2

| Component | Amount |
|---|---|
| Trimethylolpropane | 12 wt % |
| 2-pyrrolidinone | 6.5 wt % |
| 1,5-pentanediol | 2 wt % |
| EDTA disodium salt | 75 ppm |
| Trizma base | 0.2 wt % |
| Tergitol 15S7 | 1 wt % |
| Tergitol 15S5 | 1 wt % |
| Dowfax 8390 | 0.4 wt % |
| Water | Balance |

Example 2

Cyan Ink-jet Inks

Nine cyan ink-jet inks were prepared using the ink vehicle provided in Table 1a above. The ink-jet inks prepared are shown in Table 2 below:

TABLE 2

Cyan dye concentrations for each ink-jet ink prepared

| | Dye and wt % in ink vehicle | | | |
|---|---|---|---|---|
| Ink | DB199 (phthalocyanine) | *Formula 1 (a) (phthalocyanine) | *Formula 1 (b) (phthalocyanine) | AB9 (triarylmethine) |
| C2 | — | — | 4.5 wt % | — |
| C3 | — | 3.9 wt % | — | 0.3 wt % |
| C4 | — | 4.4 wt % | — | — |

*The difference between the "Formula 1 (a)" dye and the "Formula 1 (b)" dye is related to how each dye is functionalized. Both are generally included within the dye composition depicted in Formula 1 herein. However, the ratio of functionalization is different for each of the dyes with respect to the average $SO_3H$, $SO_2NH_2$, or $SO_2NH$-alkyl-OH groups functionalized thereon.

Example 3

Magenta Ink-jet Inks

Eight magenta ink-jet inks were prepared using the ink vehicle provided in Table 1 above, except for ink M5, which was prepared using the ink vehicle shown in Table 1 b. The ink-jet inks prepared are shown in Table 3 below:

TABLE 3

Magenta dye concentrations for each ink-jet ink prepared

| | Dye and wt % in ink vehicle | | | | |
|---|---|---|---|---|---|
| Ink | Ni naphthol azo triazole (Cu/Ni azo) | Formula 5 (Cu/Ni azo) | PRR 23 (Cu/Ni azo) | AR 289 (rhodamine) | AR 52 (rhodamine) |
| M1 | — | 4 wt % | — | — | — |
| M2 | — | 3.2 wt % | — | — | 0.8 wt % |
| M3 | — | 2.7 wt % | — | — | 1.2 wt % |
| M5 | — | — | 3 wt % | — | 1.2 wt % |
| M6 | 3.4 wt % | — | — | — | 1.2 wt % |
| M7 | 4 wt % | — | — | — | 1 wt % |
| M8 | 5.8 wt % | — | — | — | — |

Example 4

Yellow Ink-jet Inks

Four yellow ink-jet inks were prepared using the ink vehicle provided in Table 1a above. The ink-jet inks prepared are shown in Table 4 below:

TABLE 4

Yellow dye concentrations for each ink-jet ink prepared

| | Dye and wt % in ink vehicle | | |
|---|---|---|---|
| Ink | Formula 3 | Formula 2 | AY17 |
| Y1 | 2.3 wt % | — | 1.8 wt % |
| Y2 | — | 4.6 wt % | 1.2 wt % |
| Y3 | — | 6.2 wt % | — |

Example 5

Gamut for Various Ink Sets

Various combinations of inks were tested for gamut. The tests were conducted on both HP Premium Plus Photo Paper and HP Premium High Gloss Film Photo Paper. These results were compared to prints printed by an ink set sold by Hewlett Packard Company in an HP C6578D printhead, printed from an HP970C printer. The following procedure was used for the evaluation of the gamut volume. Color blocks of cyan, magenta, yellow, red, green, blue, and composite black were printed with the following ink fluxes, according to Table 5a below:

TABLE 5a

| | Gamut volume | | |
|---|---|---|---|
| Color blocks | Cyan ink flux (pL/600 dpi) | Magenta ink flux (pL/600 dpi) | Yellow ink flux (pL/600 dpi) |
| Cyan | 20 | — | — |
| Magenta | — | 20 | — |

TABLE 5a-continued

Gamut volume

| Color blocks | Cyan ink flux (pL/600 dpi) | Magenta ink flux (pL/600 dpi) | Yellow ink flux (pL/600 dpi) |
|---|---|---|---|
| Yellow | — | — | 20 |
| Red | — | 15 | 15 |
| Green | 15 | — | 15 |
| Blue | 15 | 15 | — |
| Composite Black | 12.5 | 12.5 | 12.5 |

The ink flux was measured in picoliters per 1/600 of a square inch. The CIELAB color coordinates were measured for the seven color blocks described and for a white paper background. The volume of the polyhedron constructed on these eight points in L*a*b* space was evaluated and is shown in Table 5b below:

TABLE 5b

Gamut for ink-jet inks printed on HP Premium Plus photo paper and HP Premium High Gloss Film paper

| INK SET | | | Gamut Volume HP Prem. Plus | Gamut Volume HP Prem. High |
|---|---|---|---|---|
| Cyan Ink | Magenta Ink | Yellow Ink | Photo Paper (1000 LAB) | Gloss Film Paper (1000 LAB) |
| C3 | M3 | Y2 | — | 455 |
| C3 | M3 | Y1 | 416 | 455 |
| C3 | M2 | Y1 | 403 | 414 |
| C4 | M3 | Y1 | 420 | 420 |
| C2 | M5 | Y3 | 366 | 430 |
| C2 | M1 | Y3 | 392 | 425 |
| C3 | M6 | Y2 | — | 452 |
| C3 | M6 | Y1 | 429 | 433 |
| C4 | M7 | Y1 | 404 | 438 |
| C2 | M7 | Y1 | 415 | 438 |
| C2 | M7 | Y3 | 392 | 413 |
| C2 | M7 | Y2 | 399 | 413 |
| C2 | M8 | Y2 | 393 | 418 |
| HP970C (cyan-magenta-yellow ink set) | | | 410 | 424 |

As shown by Table 5b above, the gamut for the various ink sets prepared in accordance with embodiments of the present invention were comparable to the ink set commercially available from Hewlett-Packard Company sold with an HP970C printer, with some of the sets having a larger gamut volume than the ink set available with the HP970C printer.

Example 6

Lightfastness for Various Ink Sets

Various combinations of inks were tested for lightfastness by using Wilhelm procedure as described in: "The Permanence and Care of Color Photographs" by Henry Wilhelm, Preservation Publishing Co., Grinell, Iowa. Cyan, magenta, yellow, and composite black tiles at an optical density of 0.5 were exposed to cool white fluorescent light at intensity of 70 kLux using an Atlas HPUV fadeometer. To correct for the paper background, the background corrections with the power of 1.5 were introduced. The time to failure was estimated based on the assumption of 450 Lux exposure per 12-hour day, that is, 1971 kLux-hour per year. The time to failure of the ink set was defined as the shortest among 9 failure criteria (that is, the fade of primary colors, composite black, and color balance).

The tests were conducted on both HP Premium Plus photo paper (unprotected by glass) and HP Premium High Gloss Film photo paper (protected by 5-mm soda-lime glass). These results were compared to an ink set sold by Hewlett Packard Company in an HP C6578D printhead in HP970C printer, and are shown in Table 6 below:

TABLE 6

Lightfastness for ink-jet inks printed on HP Premium Plus photo paper and HP Premium High Gloss Film photo paper

| INK SET | | | Lightfastness HP Prem. Plus | Lightfastness HP Prem. High |
|---|---|---|---|---|
| Cyan Ink | Magenta Ink | Yellow Ink | Photo Paper (yrs to failure) | Gloss Film Paper (yrs to failure) |
| C3 | M3 | Y1 | 28 | 26 |
| C3 | M2 | Y1 | 23 | 21 |
| C4 | M3 | Y1 | 26 | 18 |
| C2 | M5 | Y3 | 27 | 6 |
| C2 | M1 | Y3 | 40 | 47 |
| C3 | M6 | Y1 | 24 | 19 |
| C4 | M7 | Y1 | 29 | 15 |
| C2 | M7 | Y1 | 28 | 13 |
| C2 | M7 | Y3 | 24 | 19 |
| C2 | M7 | Y2 | 21 | 11 |
| C2 | M8 | Y2 | 44 | — |
| HP970C (cyan-magenta-yellow ink set) | | | 10 | 5 |

As shown by Table 6 above, the lightfastness for the various ink sets prepared in accordance with embodiments of the present invention were superior to the ink set commercially available from Hewlett-Packard Company sold in the HP C6578D printhead.

Example 7

Airfastness for Various Ink Sets

It is well known that ink-jet prints tend to fade with time when in contact with trace contaminants present in air. Airfastness of ink-jet prints is a particular problem when images are printed on micro-porous media, such as HP Premium High Gloss Film paper. In order to evaluate airfastness, atmospheric air in Corvallis, Oreg. USA, was blown over printed color palettes and the fade of images was monitored over time using the Wilhelm failure criteria (as used in the lightfastness experiment described above). The time to failure in hours for the ink set was estimated as the time in hours when the first out of nine failure criteria was reached. All of the samples were tested side-by-side. No acceleration factor due to increased air flow was introduced, and thus, the time to failure is regarded as relative, rather than as an absolute measurement.

TABLE 7

Air fade resistance for ink-jet inks printed on HP Premium High Gloss HP Premium High Gloss Film paper

| INK SET | | | Air Fade Resistance HP Prem. High Gloss Film Paper |
|---|---|---|---|
| Cyan Ink | Magenta Ink | Yellow Ink | (hours to failure) |
| C3 | M3 | Y2 | 420 |
| C3 | M3 | Y1 | 400 |
| C4 | M3 | Y1 | 315 |
| C2 | M5 | Y3 | 431 |
| C2 | M1 | Y3 | 310 |
| C3 | M6 | Y2 | 479 |
| C3 | M6 | Y1 | 477 |
| C4 | M7 | Y1 | 260 |
| C2 | M7 | Y1 | 857 |
| C2 | M7 | Y3 | 464 |
| C2 | M7 | Y2 | 969 |
| C2 | M8 | Y2 | 1048 |
| HP970C (cyan-magenta-yellow ink set | | | 190 |

As shown by Table 7 above, the air fade resistance for the various ink sets prepared in accordance with embodiments of the present invention were superior to the ink set commercially available from Hewlett-Packard Company and sold in the HP C6578D printhead.

While the invention has been described with reference to certain preferred embodiments, those skilled in the art will appreciate that various modifications, changes, omissions, and substitutions can be made without departing from the spirit of the invention. For example, though a specific vehicle is shown for use in Example 1, other vehicles can also be used. Additionally, other inks can be used with the ink sets of the present invention for alternative applications. It is intended, therefore, that the invention be limited only by the scope of the following claims.

What is claimed is:

1. A dye set for formulating ink-jet inks, comprising:
   (a) cyan colorant including a phthalocyanine dye;
   (b) magenta colorant including a copper- or nickel- containing azo dye; and
   (c) yellow colorant having the structure Formula 1:

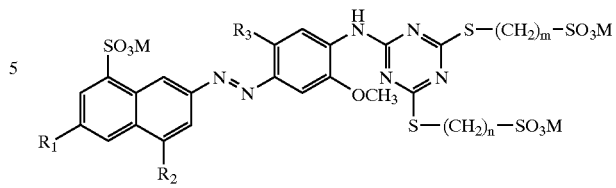

wherein $R_1$ is H, $SO_3M$, COOM, or $SO_2NH_2$;

$R_2$ is H, $SO_3M$, COOM, or $SO_2NH_2$;

$R_3$ is H or $CH_3$;

n and m are 2, 3, 4, 5 or 6; and

M is H, Na, Li, K, ammonium, ammonium substituted with alkyl or combinations thereof.

2. A dye set as in claim 1, wherein the yellow colorant has the structure Formula 2:

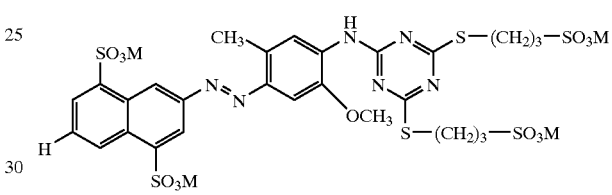

wherein M is H, Na or Li.

3. A dye set as in claim 1, wherein the yellow colorant has the structure Formula 3:

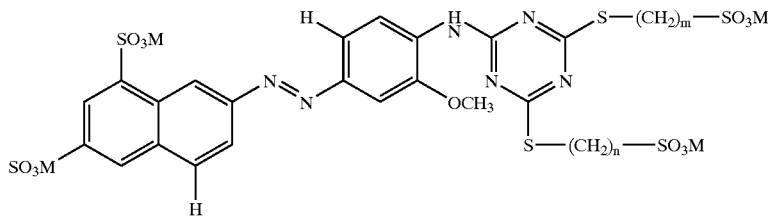

wherein M is H, Na or Li.

4. A dye set as in claim 1, wherein the cyan colorant further comprises Acid Blue 9 dye blended with the phthalocyanine dye at a 1:2 to 1:100 weight ratio.

5. A dye set as in claim 1, wherein the magenta colorant further comprises a rhodamine dye blended with the copper- or nickel- containing azo dye at a 1:80 to 125:4 weight ratio.

6. A dye set as in claim 1, wherein the yellow colorant further comprises at least one of Acid Yellow 17 and Acid Yellow 23 blended with the yellow colorant having the structure of Formula 1.

7. A dye set as in claim 1, wherein the phthalocyanine dye comprises Direct Blue 199.

8. A dye set as in claim 1, wherein the phthalocyanine dye comprises a dye including the structure:

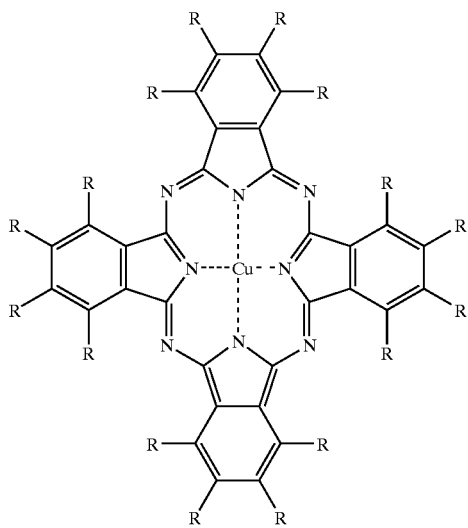

wherein each R group is independently H, SO$_3$H, SO$_2$NH$_2$, or SO$_2$NH-alkyl-OH[$_2$], with the proviso that an average of from 2 to 6 R groups are other than H.

9. A dye set as in claim 1, wherein the copper- or nickel-containing azo dye comprises Pacified or Non-Pacified Reactive Red 23.

10. A dye set as in claim 1, wherein the copper- or nickel-containing azo dye comprises a nickel metallized naphthol azo triazole.

11. A dye set as in claim 1, wherein the copper- or nickel-containing azo dye comprises a dye including the structure:

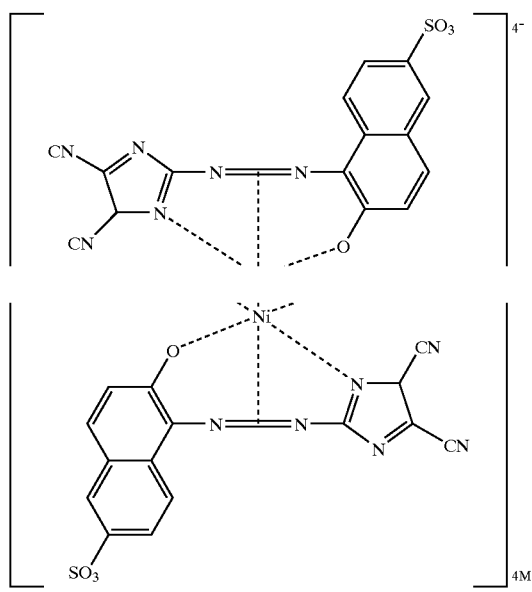

wherein M is H or a monovalent ion.

12. A dye set as in claim 5, wherein the rhodamine dye comprises a member selected from the group consisting of Acid Red 52, Acid Red 289, Acid Red 388, and mixtures thereof.

13. A dye set as in claim 1, wherein the phthalocyanine dye is a single phthalocyanine dye.

14. A dye set as in claim 1, wherein the phthalocyanine dye is at least two phthalocyanine dyes blended together.

15. A dye set as in claim 1, wherein the copper- or nickel-containing azo dye is a single copper- or nickel-containing azo dye.

16. A dye set as in claim 1, wherein the copper- or nickel-containing azo dye is at least two copper- or nickel-containing azo dyes blended together.

17. A dye set as in claim 6, wherein the yellow colorant comprises the yellow colorant having the structure Formula 2 and Acid Yellow 17 at a 3:10 to 90:1 weight ratio.

18. A dye set as in claim 6, wherein the yellow colorant comprises the yellow colorant having the structure Formula 2 and Acid Yellow 23 at a 3:10 to 90:1 weight ratio.

19. A dye set as in claim 6, wherein the yellow colorant comprises the yellow colorant having the structure Formula 3 and Acid Yellow 17 at a 3:10 to 90:1 weight ratio.

20. A dye set as in claim 6, wherein the yellow colorant comprises the yellow colorant having the structure Formula 3 and Acid Yellow 23 at a 3:10 to 90:1 weight ratio.

21. An ink set for ink-jet printing, comprising: (a) a cyan ink-jet ink including a first ink vehicle admixed with from 2 wt % to 10 wt % of a phthalocyanine dye; (b) a magenta ink-jet ink including a second ink vehicle admixed with from 0.8 wt % to 8 wt % of a copper- or nickel-containing azo dye; and (c) a yellow ink-jet ink including a third ink vehicle admixed with from 1.5 wt % to 9 wt % of a yellow colorant having the structure Formula 1:

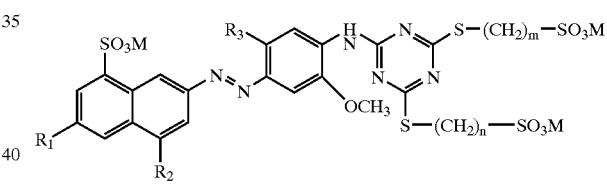

wherein R$_1$ is H, SO$_3$M, COOM, or SO$_2$NH$_2$;
R$_2$ is H, SO$_3$M, COOM, or SO$_2$NH$_2$;
R$_3$ is H or CH3;
n and m are 2, 3, 4, 5 or 6 ; and
M is H, Na, Li, K, ammonium, ammonium substituted with alkyl or combinations thereof.

22. An ink set as in claim 21, wherein the yellow colorant has the structure Formula 2:

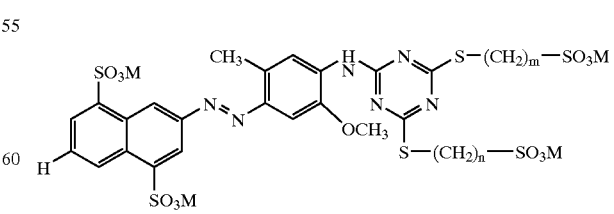

wherein M is H, Na or Li.

23. An ink set as in claim 21, wherein the yellow colorant has the structure Formula 3:

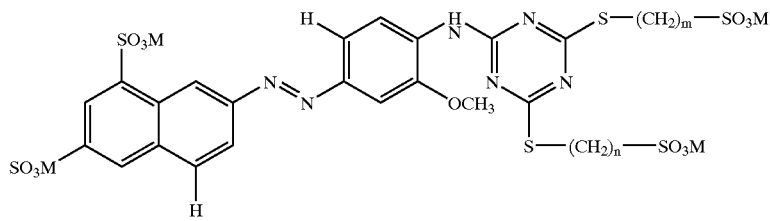

wherein M is H, Na or Li.

24. An ink set as in claim 21, wherein the cyan ink-jet ink further comprises from 0.1 wt % to 1 wt % of Acid Blue 9 dye admixed in the first ink vehicle.

25. An ink set as in claim 21, wherein the magenta ink-jet ink further comprises from 0.1 wt % to 2.5 wt % of a rhodamine dye admixed in the second ink vehicle.

26. An ink set as in claim 21, wherein the yellow ink-jet ink further comprises from 0.1 wt % to 5 wt % of a member selected from the group consisting of Acid Yellow 17, Acid Yellow 23, and mixtures thereof, admixed in the third ink vehicle.

27. An ink set as in claim 21, wherein the phthalocyanine dye comprises Direct Blue 199.

28. An ink set as in claim 21, wherein the phthalocyanine dye comprises a dye including the structure:

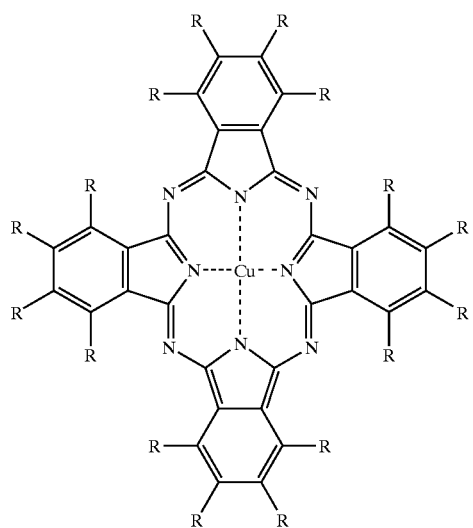

wherein each R group is independently H, $SO_3H$, $SO_2NH_2$, or $SO_2NH$-alkyl-$OH[_2]$, with the proviso that an average of from 2 to 6 R groups are other than H.

29. An ink set as in claim 21, wherein the copper- or nickel-containing azo dye comprises Pacified Reactive Red 23.

30. An ink set as in claim 21, wherein the copper- or nickel-containing azo dye comprises a nickel metallized naphthol azo triazole.

31. An ink set as in claim 21, wherein the copper- or nickel-containing azo dye comprises a dye having the structure:

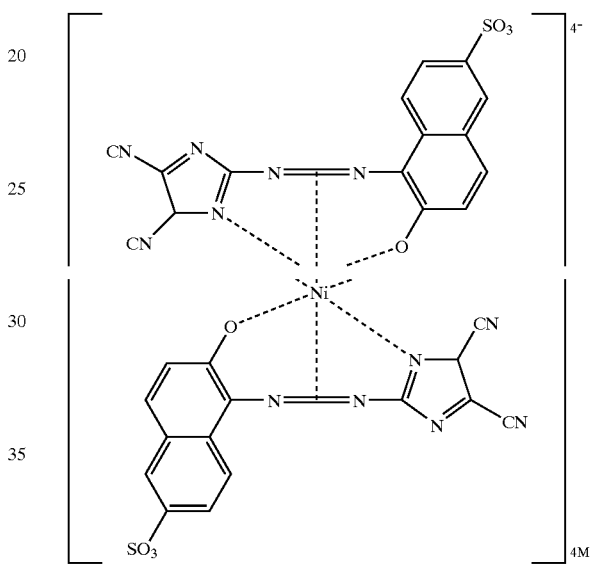

wherein M is H or a monovalent ion.

32. An ink set as in claim 25, wherein the rhodamine dye comprises a member selected from the group consisting of Acid Red 52, Acid Red 289, Acid Red 388, and mixtures thereof.

33. An ink set as in claim 21, wherein the phthalocyanine dye is a single phthalocyanine dye.

34. An ink set as in claim 21, wherein the phthalocyanine dye is at least two phthalocyanine dyes blended together.

35. An ink set as in claim 21, wherein the copper- or nickel-containing azo dye is a single copper- or nickel-containing azo dye.

36. An ink set as in claim 21, wherein the copper- or nickel-containing azo dye is at least two copper- or nickel-containing azo dyes blended together.

* * * * *